(12) United States Patent
Fujioka

(10) Patent No.: US 6,658,493 B1
(45) Date of Patent: Dec. 2, 2003

(54) MICROCOMPUTER EXCHANGING DATA WITH HOST COMPUTER

(75) Inventor: Shuzo Fujioka, Hyogo (JP)

(73) Assignees: Mitsubishi Denki Kabushiki Kaisha, Tokyo (JP); Mitsubishi Electric System LSI Design Corporation, Itami (JP)

(*) Notice: Subject to any disclaimer, the term of this patent is extended or adjusted under 35 U.S.C. 154(b) by 522 days.

(21) Appl. No.: 09/634,949

(22) Filed: Aug. 7, 2000

(30) Foreign Application Priority Data

Feb. 21, 2000 (JP) ........................................ 2000-043629

(51) Int. Cl.$^7$ ................................................. G06F 3/00
(52) U.S. Cl. ............................... 710/1; 710/33; 710/52; 710/106; 712/225
(58) Field of Search ........................ 712/225; 710/1, 710/2, 7, 20, 29, 36, 52, 54–57, 105, 106, 31, 33

(56) References Cited

U.S. PATENT DOCUMENTS

| | | | |
|---|---|---|---|
| 5,058,111 A | * 10/1991 | Kihara et al. | 370/94.1 |
| 5,193,089 A | * 3/1993 | Tsuchida | 370/84 |
| 5,398,240 A | * 3/1995 | Nakashima et al. | 370/85.1 |
| 5,506,965 A | * 4/1996 | Naoe | 395/200.17 |
| 5,543,938 A | * 8/1996 | Fukushima | 358/407 |
| 5,682,552 A | * 10/1997 | Kuboi et al. | 710/52 |

FOREIGN PATENT DOCUMENTS

JP 7-248994 9/1995

* cited by examiner

*Primary Examiner*—Jeffrey Gaffin
*Assistant Examiner*—Mai RiJue
(74) *Attorney, Agent, or Firm*—Burns, Doane, Swecker & Mathis, LLP

(57) ABSTRACT

When reception data transmitted from a host computer is held in a transmission/reception buffer of a microcomputer, a reception flag is set to inhibit the holding of new data in the transmission/reception buffer. Also, when transmission data to be transmitted to the host computer is held in the transmission/reception buffer, a transmission flag is set to inhibit the holding of new data in the transmission/reception buffer. Though the reception flag is cleared in cases where the reception data is read out from the transmission/reception buffer to a central processing unit or the transmission flag is cleared in cases where the transmission data is read out from the transmission/reception buffer to the host computer, the central processing unit always clears the reception flag and the transmission flag before the central processing unit accesses to the transmission/reception buffer to read out the reception data or write next transmission data from/in the transmission/reception buffer. Therefore, even though the reception flag or the transmission flag is still set because of the occurrence of an abnormal state, a next data transmission/reception can be reliably performed.

13 Claims, 14 Drawing Sheets

MICROCOMPUTER EXCHANGING DATA WITH HOST COMPUTER

BACKGROUND OF THE INVENTION

1. Field of the Invention

The present invention relates to a microcomputer with a transmission/reception buffer in which a data transmission to a host computer and a data reception from the host computer are performed, and more particularly to a microcomputer in which various problems occurring in a data exchange with the host computer are solved.

2. Description of Related Art

FIG. 12 is a block diagram showing the configuration of a conventional system composed of a conventional microcomputer and a host computer connected with the conventional microcomputer. In FIG. 12, a reference sign 25 indicates a microcomputer, a reference sign 26 indicates a host computer, a reference sign 27 indicates a central processing unit, a reference sign 28 indicates a read only memory (ROM), a reference sign 29 indicates a random access memory (RAM), a reference sign 30 indicates an enciphering circuit for performing a data enciphering processing and a data deciphering processing, a reference sign 31 indicates an integrated circuit (IC) card interface circuit for exchanging data with an IC card, a reference sign 32 indicates a re-writable ROM for storing various types of data, a reference sign 33 indicates a direct memory access controller (DMAC), a reference sign 34 indicates a host interface circuit for receiving and transmitting data from/to the host computer 26, and a reference sign 35 indicates an internal data bus having an 8-bit bus width. In this prior art, as information received and transmitted between the host computer 26 and the host interface circuit 34, data passing through an external data bus having an 8-bit bus width, a pair of an external read control signal and an external write signal (R/W), an external chip selection (CS) signal and other various control signals are shown in FIG. 12.

FIG. 13 is a block diagram showing the configuration of the host interface circuit 34 of the conventional microcomputer and a periphery of the host interface circuit 34. In FIG. 13, a reference sign 36 indicates a transmission/reception buffer arranged between the external data bus and the internal data bus 35, a reference sign 37 indicates a reception flag, a reference sign 38 indicates a transmission flag for outputting a read-out signal, and a reference sign 39 indicates a ready flag for outputting a busy signal.

Next, an operation will be described.

FIG. 14 is a flow chart showing the procedure performed in the conventional system shown in FIG. 12 and FIG. 13 according to a program executed in the central processing unit 27 in cases where data is written in the transmission/reception buffer 36. In FIG. 14, in a data transmission from the host computer 26 to the microcomputer 25 functioning as a slave processor, an operation of the host interface circuit 34 is started to prepare the holding of the reception data in the transmission/reception buffer 36. Thereafter, in a step ST15, it is judged by referring to a value of the reception flag 37 whether or not reception data not yet read-out exists in the transmission/reception buffer 36. In cases where reception data not yet read-out exists, in a step ST16, the central processing unit 27 accesses to the transmission/reception buffer 36 to read out the reception data not yet read-out. Thereafter, in a step ST17, it is judged by referring to a value of the reception flag 37 whether or not next reception data is received in the transmission/reception buffer 36. In cases where next reception data is received from the host computer 26, the procedure returns to the step ST15. In contrast, in cases where next reception data is not received, the procedure is completed.

FIG. 15 is a flow chart showing the procedure performed in the conventional system shown in FIG. 12 and FIG. 13 according to a program executed in the central processing unit 27 in cases where data to be transmitted to the host computer 26 is generated in the central processing unit 27. In FIG. 15, in a data transmission from the microcomputer 25 functioning as a slave processor to the host computer 26, an operation of the host interface circuit 34 is started to prepare the writing of transmission data generated in the central processing unit 27 in the transmission/reception buffer 36. Thereafter, in a step ST18, it is judged by referring to the transmission flag 38 whether or not transmission data to be transmitted to the host computer 26 exists in the transmission/reception buffer 36. In cases where preceding transmission data to be transmitted to the host computer 26 exists in the transmission/reception buffer 36, the procedure waits for the reading-out of the preceding transmission data from the transmission/reception buffer 36. In contrast, in cases where preceding transmission data to be transmitted to the host computer 26 does not exist, in a step ST19, the central processing unit 27 accesses to the transmission/reception buffer 36 to write current transmission data generated in the central processing unit 27 in the transmission/reception buffer 36. Thereafter, it is judged by referring to the transmission flag 38 whether or not next transmission data to be transmitted to the host computer 26 is generated in the central processing unit 27. In cases where next transmission data is generated in the central processing unit 27, the procedure returns to the step ST18. In contrast, in cases where next transmission data is not generated in the central processing unit 27, the procedure is completed.

As is described above, in cases where the data transmission/reception is performed between the host computer 26 and the microcomputer 25, a handshaking described hereinafter in detail is established between the host computer 26 and the microcomputer 25 under the control of the central processing unit 27.

For example, in cases where data is transmitted from the host computer 26 to the microcomputer 25, the host computer 26 sets data on the external data bus, asserts an external chip selection signal set to a low level and drives an external read/write signal to a low level. In response to the signal setting of the host computer 26, in the microcomputer 25, the transmission/reception buffer 36 latches and holds the data transmitted through the external data bus in synchronization with an edge of the external write control signal, a flag is set in the reception flag 37 to inhibit another data holding of the transmission/reception buffer 36. Thereafter, the procedure shown in FIG. 14 is performed according to the flag of the reception flag 37 under the control of the central processing unit 27 to read out the data held in the transmission/reception buffer 36 and to perform the prescribed processing. For example, in cases where enciphered data is received in the microcomputer 25, the enciphered data is transferred from the transmission/reception buffer 36 to an enciphered data buffer of the enciphering circuit 30 to decipher the enciphered data in the enciphering circuit 30, and various operations are performed according to the deciphered data.

Also, in cases where data is transmitted from the microcomputer 25 to the host computer 26, the microcomputer 25 holds the data in the transmission/reception buffer 36. In response to the data holding, a flag is set in each of the transmission flag 38 and the ready flag 39 to inhibit another data holding of the transmission/reception buffer 36. Thereafter, the host computer 26 reads out the data from the transmission/reception buffer 36 according to the states of the transmission flag 38 and the ready flag 39.

After the data read-out, each of the reception flag 37, the transmission flag 38 and the ready flag 39 is reset by a hardware operation of the microcomputer 25 according to an access to the transmission/reception buffer 36 or a data holding state of the transmission/reception buffer 36.

Because the conventional microcomputer 25 has the above-described configuration, in cases where data is exchanged between the upward host computer 26 and the microcomputer 25, various problems described hereinafter occur, so that there is a drawback that an operation reliability in the system using the microcomputer 25 becomes low.

As a first problem, in cases where a flag set in the transmission flag 38 or the reception flag 37 is not reset because an abnormal state occurs in a preceding data transmission/reception, a current data transmission/reception cannot be performed.

As a second problem, in cases where a flag of the ready flag 39 is put down (in other words, a flag indicating a busy state is written in the ready flag 39) because of the occurrence of a certain state during an access operation of the host computer 26 to the microcomputer 25 through the external data bus, the host computer 26 must undesirably wait for a data transmission/reception until the busy flag of the ready flag 39 is put down. Therefore, in the worst case, the whole system including the host computer 26 is undesirably frozen.

As a third problem, because the transmission/reception buffer 36 latches the data transmitted through the external data bus in synchronization with the leading edge of the write control signal in this conventional system, this conventional system cannot be made by using a generally-used host computer in which a data holding time-period (for example, a set-up time or a holding time) is merely prescribed for clocks transmitted through an external system bus. As a result, a specialized high-cost host computer is required as the host computer 26.

As a fourth problem, because the enciphered data received in the transmission/reception buffer 36 is transferred to the buffer of the enciphering circuit 30 and is deciphered, as compared with other data, it takes a long time to convert the enciphered data into a deciphered type usable in the central processing unit 27.

SUMMARY OF THE INVENTION

An object of the present invention is to provide, with due consideration to the drawbacks of the conventional microcomputer, a microcomputer in which each of the problems occurring in a data exchange with an upward host computer is solved to improve an operation reliability in a system composed of the microcomputer and the host computer.

The object is achieved by the provision of a microcomputer, in which a central processing circuit, storing means, an internal data bus connecting the central processing circuit and the storing means and a transmission/reception buffer arranged between an external data bus and the internal data bus, comprising:

a reception flag which is set according to a write-in to the transmission/reception buffer from an outside and is reset according to a read-out from the transmission/reception buffer to the central processing circuit; and a transmission flag which is set according to a write-in to the transmission/reception buffer from the central processing circuit and is reset according to a read-out from the transmission/reception buffer to the outside, wherein the central processing circuit accesses to the transmission/reception buffer after the central processing circuit resets the reception flag and the transmission flag.

In the above configuration, in cases where an abnormal state occurs in a preceding data reception in the microcomputer when preceding data is received from the outside such as a host computer, the reception flag is maintained to a set state so as to inhibit a write-in of current data to the transmission/reception buffer in a current data reception. However, because the central processing circuit resets the reception flag before the central processing circuit accesses to the transmission/reception to perform the current data reception, the central processing circuit can receives the current data in the current data reception.

Also, in cases where an abnormal state occurs in a preceding data transmission in the microcomputer when preceding data is transmitted to the outside such as a host computer, the transmission flag is maintained to a set state so as to inhibit a write-in of current data to the transmission/reception buffer in a current data transmission. However, because the central processing circuit resets the transmission flag before the central processing circuit accesses to the transmission/reception to perform the current data transmission, the central processing circuit can write the current data in the current data transmission to read out the current data to the outside. Accordingly, because the central processing circuit can always reset the reception flag even though the reception flag is set and because the central processing circuit can write data in the transmission/reception buffer after the transmission flag is reset regardless of whether the transmission flag is set, even though an abnormal state occurs in the data transmission/reception of the microcomputer not to reset the transmission flag or the reception flag, a next data transmission/reception can be normally performed, so that an operation reliability of the microcomputer can be improved.

It is applicable that the internal data bus and the transmission/reception buffer be formed to correspond to a bus width which is N times (N is a positive integral number) that of the external data bus, and the central processing circuit select either the bus width of the internal data bus or the bus width of the external data bus according to a change-over signal input from the outside to access to the transmission/reception buffer at the selected bus width.

In the prior art, the internal data bus and the transmission/reception buffer are formed to correspond to the same bus width as that of the external data bus. However, in the present invention, because the internal data bus and the transmission/reception buffer are formed to correspond to a bus width which is N times that of the external data bus, a processing time required in the microcomputer can be considerably shortened in the transmission/reception of data having a bit width corresponding to all bus width of the internal data bus and the transmission/reception buffer. In particular, because the used bus width in the accessing of the central processing unit to the transmission/reception buffer is changed over according to the change-over signal input from the outside, the used bus width can be set to a value suitable for a type of data transmitting through the external data bus and the internal data bus and/or used states of the external data bus and the internal data bus. Therefore, a processing speed for the data can be improved as compared with the accessing at a fixed bus width.

The object is also achieved by the provision of a microcomputer, in which a central processing circuit, storing means, an internal data bus connecting the central processing circuit and the storing means and a transmission/reception buffer arranged between an external data bus and the internal data bus, comprising:

a ready flag for outputting a busy signal in cases where data is held in the transmission/reception buffer;

a timer for measuring an elapsed time starting from a time that the busy signal is output by the ready flag and outputting a time-out signal at a time that the elapsed time reaches a prescribed value; and a logical circuit for outputting the busy signal output from the ready flag to an outside in a prescribed time-period extending from the outputting of the busy signal performed by the ready flag to the outputting of the time-out signal performed by the timer.

In the above configuration, in cases where an abnormal state occurs in a preceding data reception in the microcomputer after preceding data transmitted from the outside such as a host computer is held in the transmission/reception buffer, the preceding data is not read out to the central processing unit but is kept holding in the transmission/reception buffer. Also, in cases where an abnormal state occurs in a preceding data transmission in the microcomputer after preceding data to be transmitted to the outside such as a host computer is held in the transmission/reception buffer, the preceding data is not read out to the outside but is kept holding in the transmission/reception buffer. In this data holding state of the transmission/reception buffer, the ready flag outputs the busy signal to the logical circuit to output the busy signal from the logical circuit, so that a write-in of current data to the transmission/reception buffer is inhibited in a current data transmission/reception.

However, because an elapsed time is measured in the timer and because the busy signal is not output from the logical circuit after the prescribed time-period passes, the current data is written in and held in the transmission/reception buffer in the current data transmission/reception after the prescribed time-period passes.

Accordingly, even though a normal data reception cannot be performed in the transmission/reception buffer during the prescribed time-period, because the transmission/reception buffer is released from the inhibition of the current data reception and is returned to a normal state, the normal data reception can be performed in the transmission/reception buffer after the prescribed time-period passes, so that an operation reliability of the microcomputer can be improved.

The object is also achieved by the provision of a microcomputer, in which a central processing circuit, storing means, an internal data bus connecting the central processing circuit and the storing means and a transmission/reception buffer arranged between an external data bus and the internal data bus, comprising:

a latch signal producing circuit for receiving a referential clock signal used for a data transmission/reception and a write control signal indicating a write period from the external data bus and outputting a latch signal at an edge timing of the referential clock signal in the write period, wherein the transmission/reception buffer latches data from the external data bus according to the latch signal output from the latch signal producing circuit.

In the above configuration, because the transmission/reception buffer latches data from the external data bus according to the latch signal which is output at the edge timing of the referential clock signal in the write period, the transmission/reception buffer latches the data of the external data bus at the edge timing of the referential clock signal in the write period.

Accordingly, even though the data holding of the transmission/reception buffer at the edge timing of the write control signal is not guaranteed in the microcomputer, the data of the external data bus can be reliably latched and held in the transmission/reception buffer, so that an operation reliability of the microcomputer can be improved.

The object is also achieved by the provision of a microcomputer, in which a central processing circuit, storing means, an internal data bus connecting the central processing circuit and the storing means and a transmission/reception buffer arranged between an external data bus and the internal data bus, comprising:

an enciphering circuit, having a second transmission/reception buffer, for enciphering or deciphering data stored in the second transmission/reception buffer;

a selector, connected with the external data bus, for selecting either the transmission/reception buffer or the second transmission/reception buffer as an internal connected buffer to directly connect the external data bus and the internal connected buffer; and a selector flag, in which a value is written by the central processing unit, for outputting a selector signal corresponding to the value to the selector to make the selector determine the internal connected buffer according to the selector signal.

In the above configuration, in cases where data transmitted from an outside such as a host computer to the microcomputer is enciphered, or in cases where it is required to encipher data to be transmitted from the microcomputer to the outside, the central processing unit writes a value in the selector flag, the selector flag outputs a selection signal corresponding to the value to the selector, and the selector selects the second transmission/reception buffer according to the selector signal to directly connect the external data bus and the second transmission/reception buffer. Therefore, enciphered data transmitted from the outside is stored in the second transmission/reception buffer through the external data bus and is deciphered in the enciphering unit, and the deciphered data is processed in the central processing unit. Also, data to be transmitted from the microcomputer is once stored in the second transmission/reception buffer and is enciphered in the enciphering unit, and the enciphered data is transmitted to the outside through the external data bus.

Accordingly, because a direct transmission/reception of data can be performed between the second transmission/reception buffer and the external data bus in cases where it is required to decipher or encipher the data, in comparison with a case that the data is once stored in the transmission/reception buffer and is transferred to the enciphering unit, a data processing time can be shortened by a data transferring time, so that an operation reliability of the microcomputer can be improved.

DETAILED DESCRIPTION OF THE PREFERRED EMBODIMENTS

The invention will now be described with reference to the accompanying drawings.

EMBODIMENT 1

Figure 1:
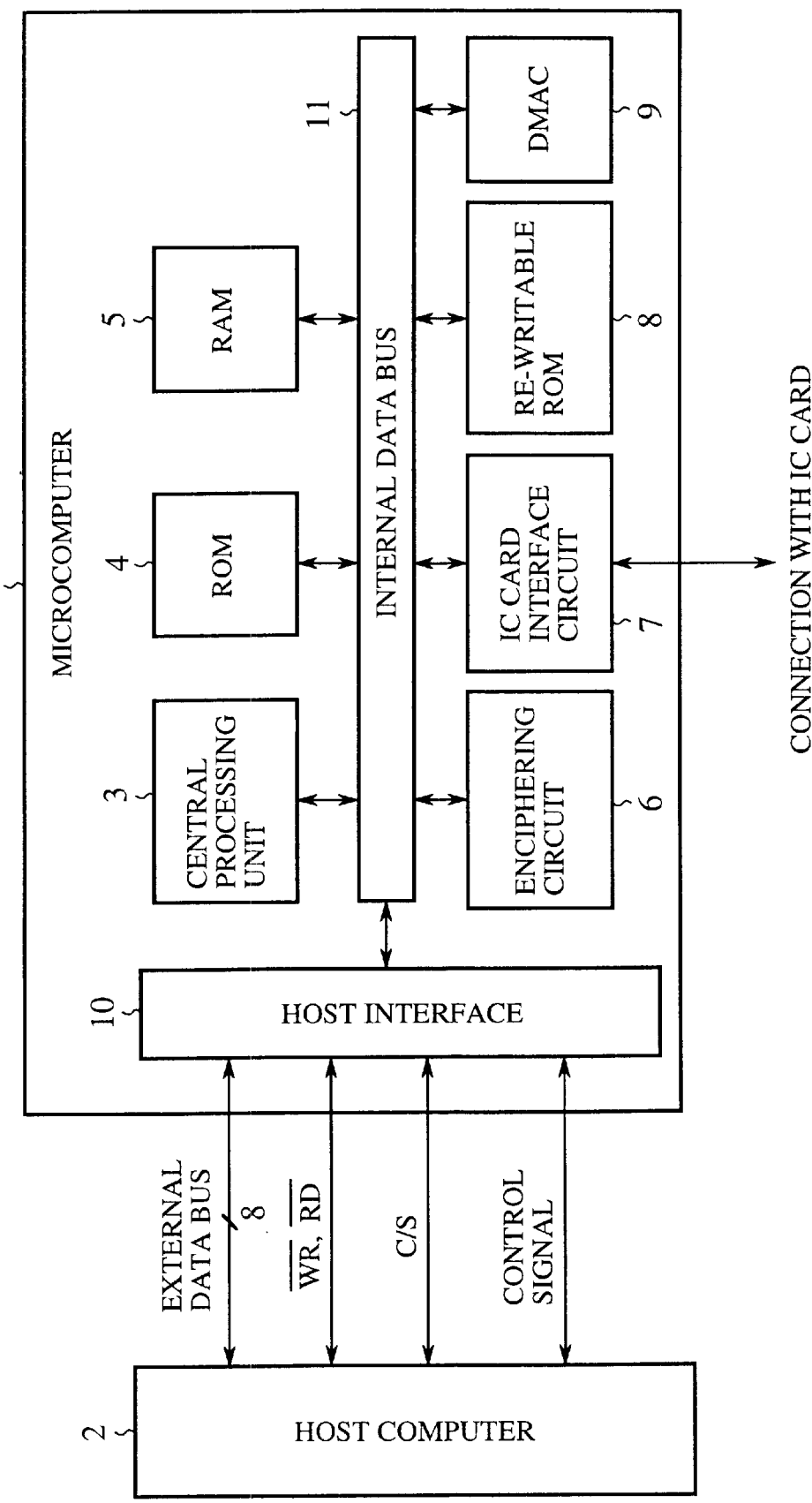
FIG. 1 is a block diagram showing the configuration of a system composed of a microcomputer and a host computer connected with the microcomputer according to a first embodiment of the present invention.

FIG. 1 is a block diagram showing the configuration of a system composed of a microcomputer and a host computer connected with the microcomputer according to a first embodiment of the present invention. This system is, for example, used for a charge automatic payment system in which the accounting for a gate passage of a person, a car or the like is automatically performed. In FIG. 1, a reference sign 1 indicates a microcomputer put on a fixed object such as a gate, a reference sign 2 indicates a host computer arranged in a movable object, a reference sign 3 indicates a central processing unit, a reference sign 4 indicates a read only memory (ROM, functioning as a storing means) for storing a program executed by the central processing unit 3, a reference sign 5 indicates a random access memory (RAM, functioning as the storing means) in which an execution area of the central processing unit 3 is set, a reference sign 6 indicates an enciphering circuit, having an enciphered data buffer, for performing an enciphering processing for data held in the enciphered data buffer and performing a deciphering processing for enciphered data held in the enciphered data buffer, a reference sign 7 indicates an IC card interface circuit for exchanging data with an IC card (not shown) in which a remaining amount of pre-paid money is written, a reference sign 8 indicates a re-writable ROM (functioning as the storing means) for storing various types of data, a reference sign 9 indicates a direct memory access controller (DMAC) for controlling the data exchange among the peripheral circuits 4 to 8 in place of the central processing unit 3, a reference sign 10 indicates a host interface circuit for performing a data transmission/reception with the host computer 2, and a reference sign 11 indicates an internal data bus, having a 16-bit bus width, for connecting the periphery circuits 4 to 10 with the central processing unit 3.

In this embodiment, as information received and transmitted between the host computer 2 and the host interface circuit 10, data passing through an external data bus having an 8-bit bus width, an external read control signal indicating a read period in which data is read out from the microcomputer 1 to the host computer 2, an external write control signal indicating a write period in which data transmitted from the host computer 2 is written in the microcomputer 1, an external chip selection (CS) signal and other various control signals are shown in FIG. 1. Also, the host interface circuit 10 is connected with the host computer 2 through a wire circuit or a radio communication.

Figure 2:
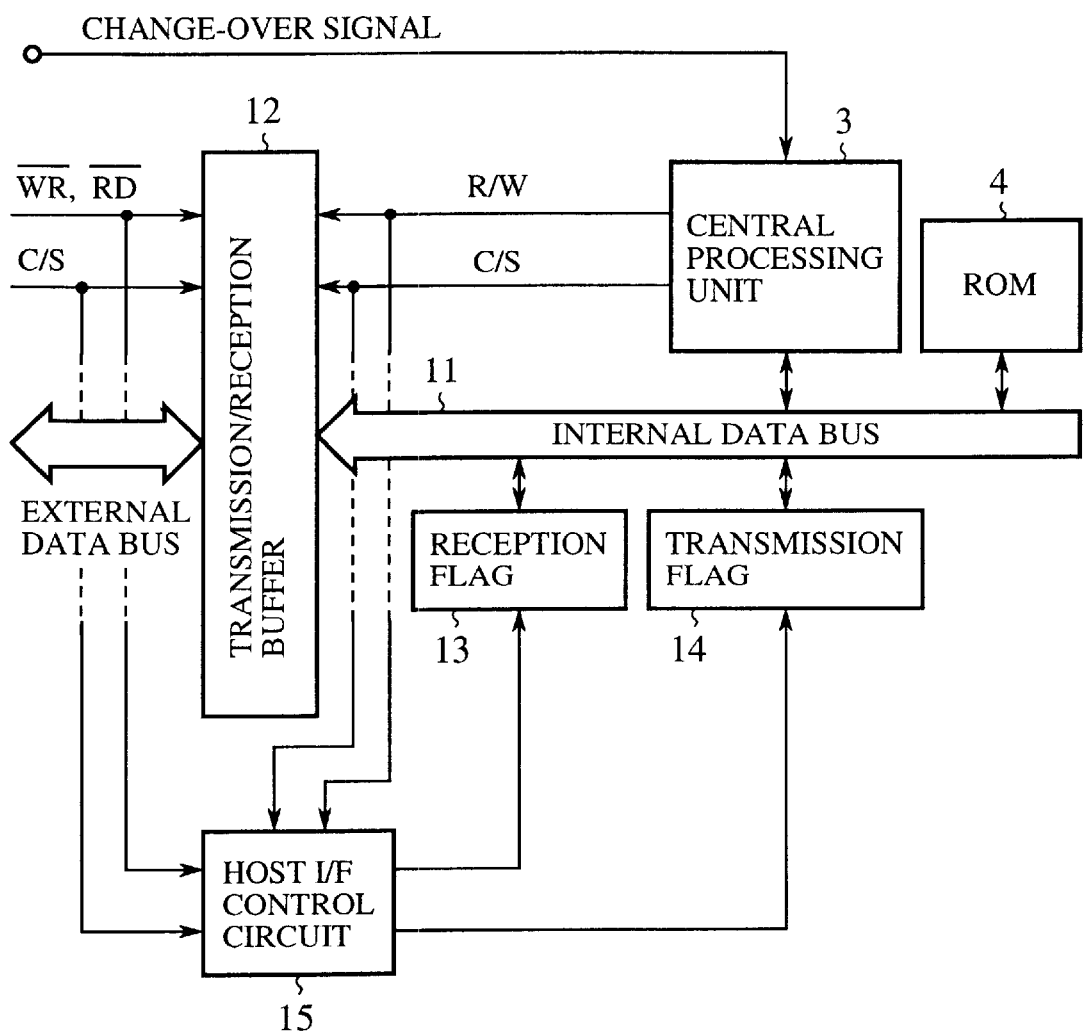
FIG. 2 is a block diagram showing the configuration of both a host interface circuit of the microcomputer and a periphery of the host interface circuit shown in FIG. 1.

FIG. 2 is a block diagram showing the configuration of both the host interface circuit 10 of the microcomputer 1 and a periphery of the host interface circuit 10. In FIG. 2, a reference sign 12 indicates a transmission/reception buffer, arranged between the external data bus and the internal data bus 11 and corresponding to the holding of 16-bit data transmitting through the external data bus or the internal data bus 11, for receiving the external read control signal, the external write control signal and the external chip selection signal from the host computer 2, receiving an internal read/write signal (an internal read signal or an internal write signal) R/W and an internal chip selection signal C/S from the central processing unit 3, holding 8-bit data or 16-bit data of the external data bus and holding 8-bit data or 16-bit data of the internal data bus 11. A reference sign 13 indicates a reception flag, connected with the internal data bus 11, which is set according to the writing of reception data transmitted from the host computer 2 to the transmission/reception buffer 12 by having a value indicating a set state and is reset according to the reading-out of the reception data from the transmission/reception buffer 12 to the central processing circuit 3 by having a value indicating a reset state. A reference sign 14 indicates a transmission flag, connected with the internal data bus 11, which is set according to the writing of transmission data generated in the central processing circuit 3 to the transmission/reception buffer 12 by having a value indicating a set state and is reset according to the reading-out of the transmission data from the transmission/reception buffer 12 to the host computer 2 by having a value indicating a reset state. A reference sign 15 indicates a host interface control circuit for receiving the same signals as those received in the transmission/reception buffer 12, judging according to the received signals whether or not the central processing unit 3 accesses to the transmission/reception buffer 12, judging according to the received signals whether or not data transmitting through the external data bus is held in the transmission/reception buffer 12 and performing a flag set control or a flag reset control for each of the reception flag 13 and the transmission flag 14 to change the value of each of the reception flag 13 and the transmission flag 14. Also, a change-over signal is input from the outside to the central processing unit 3, and a used bus width in the accessing of the central processing unit 3 to the transmission/reception buffer 12 is set to either lower 8 bits of the internal data bus or all 16 bits of the internal data bus according to the change-over signal.

Next, an operation is described with reference to FIG. 3 and FIG. 4.

Figure 3:
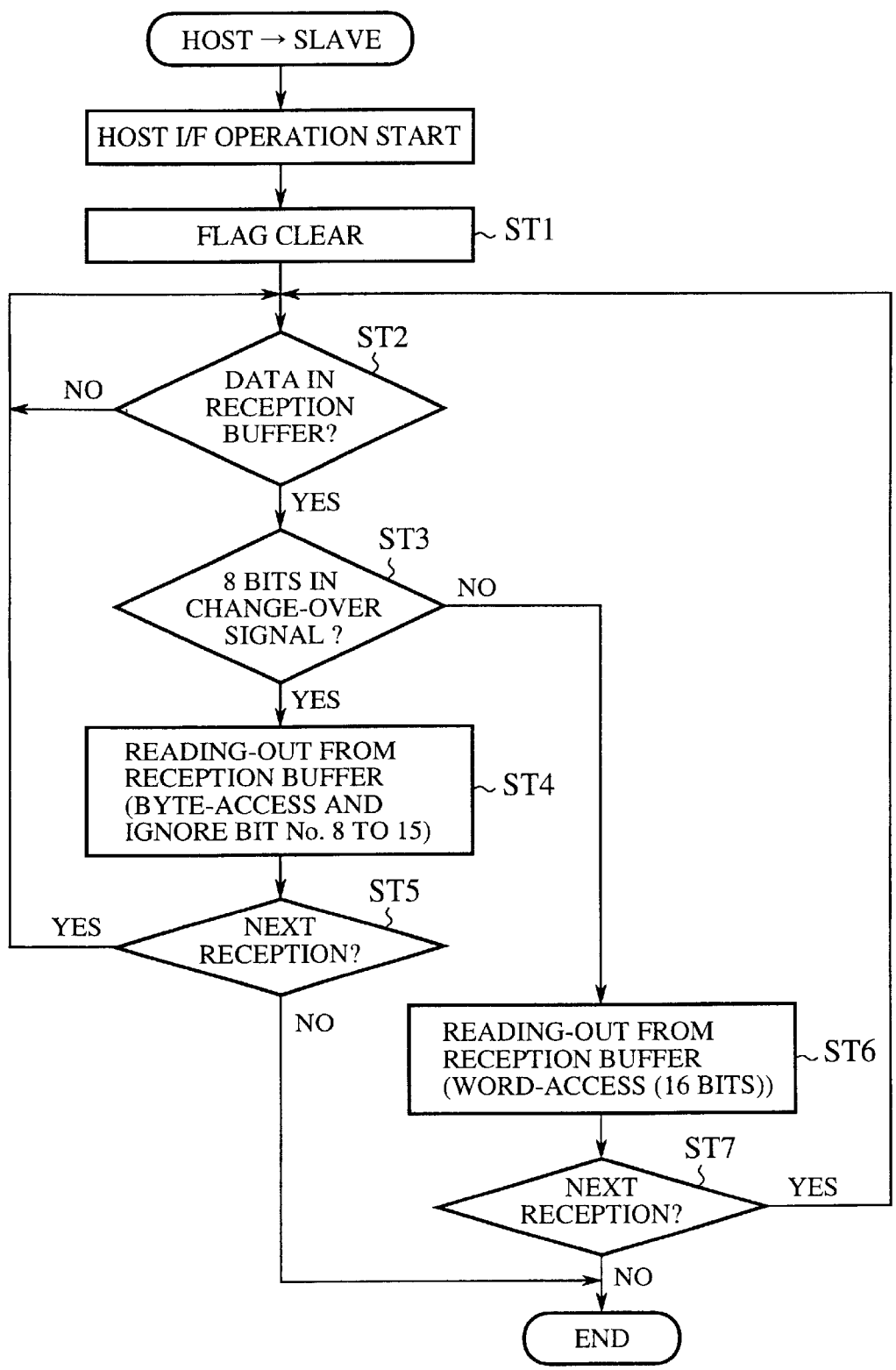
FIG. 3 is a flow chart showing the procedure performed in the system shown in FIG. 1 and FIG. 2 according to a program executed in a central processing unit in cases where data of the host computer is written in a transmission/reception buffer.

FIG. 3 is a flow chart showing the procedure performed in the system shown in FIG. 1 and FIG. 2 according to a program executed in the central processing unit 3 in cases where data of the host computer 2 is written in the transmission/reception buffer 12. In FIG. 3, in a data transmission from the host computer 2 to the microcomputer 1 functioning as a slave processor, an operation of the host interface circuit 10 is started to prepare the holding of the data in the transmission/reception buffer 12. Therefore, when data transmitted from the host computer 2 is written in the transmission/reception buffer 12 of the microcomputer 1 as reception data, a flag is set in the reception flag 13 under the control of the host interface control circuit 15 to inhibit another data holding of the transmission/reception buffer 12. In a normal operation, when the data written in the transmission/reception buffer 12 is read out to the central processing unit 12, the flag of the reception flag 13 is reset under the control of the host interface control circuit 15 operated according to a reset instruction of the central processing unit 3 to permit a data holding of the transmission/reception buffer 12. Also, a flag is set in the reception flag 13 each time data transmitted from the host computer 2 is written in the transmission/reception buffer 12. However, in cases where the reception data is not read out from the transmission/reception buffer 12 because of the occurrence of an abnormal state in the microcomputer 1, the flag of the reception flag 13 is not reset.

Therefore, in a step ST1, before the central processing unit 3 accesses to the transmission/reception buffer 12 to read out reception data held in the transmission/reception buffer 12 or to write transmission data in the transmission/reception buffer 12, regardless of whether each of the flags of the reception flag 13 and the transmission flag 14 is set, values of the reception flag 13 and the transmission flag 14 are cleared (or reset) under the control of the host interface control circuit 15 operated according to a clear instruction of the central processing unit 3.

In a step ST2, it is judged whether or not reception data not yet read-out exists in the transmission/reception buffer 12. In cases where no reception data exists in the transmission/reception buffer 12, the central processing unit 3 waits for reception data transmitted from the host computer 2. In contrast, in cases where reception data not yet read-out exists, in a step ST3, it is judged according to a change-over signal received from the outside whether or not the accessing of the central processing unit 3 to the transmission/reception buffer 12 is performed at only lower 8 bits. In cases where the accessing to the transmission/reception buffer 12 is performed at only the lower 8 bits because the reception data held in the transmission/reception buffer 12 has only an 8-bit width, in a step ST4, the central processing unit 3 performs a read-accessing to the transmission/reception buffer 12 and reads out the reception data of the lower 8 bits (bit No. 0 to 7) from the transmission/reception buffer 12.

Thereafter, in a step ST5, it is judged according to a value of the reception flag 13 whether or not next reception data is received in the transmission/reception buffer 12. In cases where the value of the reception flag 13 indicates a reset state, because no next reception data is received, the procedure is completed. In contrast, in cases where the value of the reception flag 13 indicates a set state, because next reception data is received after the step ST4, the procedure returns to the step ST2.

In contrast, in cases where it is judged in the step ST3 that the accessing to the transmission/reception buffer 12 is not performed at the lower 8 bits because the reception data held in the transmission/reception buffer 12 has a 16-bit width, in a step ST6, the central processing unit 3 performs a read-accessing to the transmission/reception buffer 12 and reads out the reception data of the all 16 bits from the transmission/reception buffer 12. Thereafter, in a step ST7, it is judged according to a value of the reception flag 13 whether or not next reception data is received in the transmission/reception buffer 12. In cases where no next reception data is received, the procedure is completed. In contrast, in cases where next reception data is received, the procedure returns to the step ST2.

Figure 4:
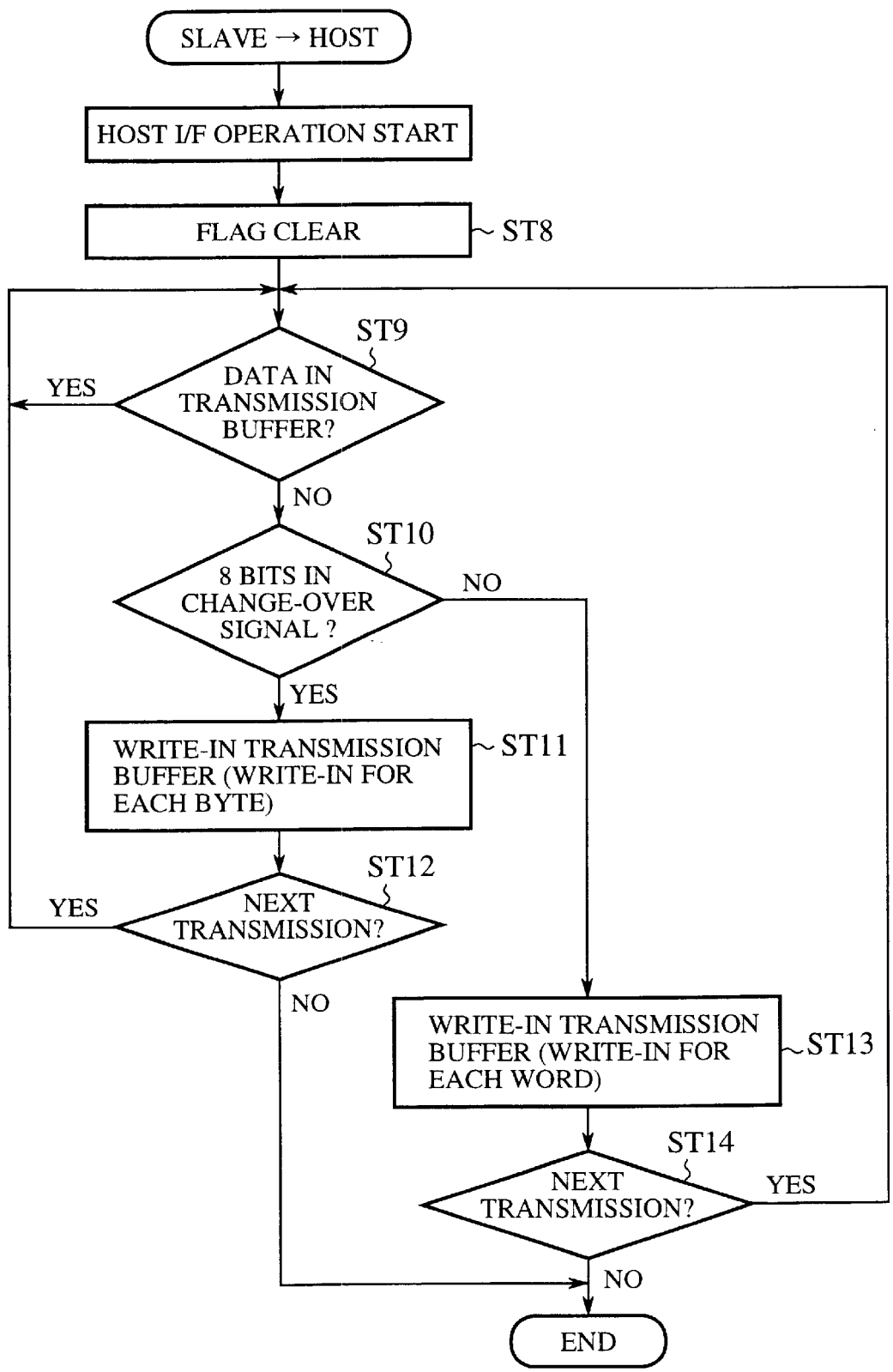
FIG. 4 is a flow chart showing the procedure performed in the system shown in FIG. 1 and FIG. 2 according to a program executed in the central processing unit in cases where data to be transmitted to the host computer is generated in the central processing unit.

FIG. 4 is a flow chart showing the procedure performed in the system shown in FIG. 1 and FIG. 2 according to a program executed in the central processing unit 3 in cases where data to be transmitted to the host computer 2 is generated in the central processing unit 3. In FIG. 4, in a data transmission from the microcomputer 1 functioning as a slave processor to the host computer 2, an operation of the host interface circuit 10 is started to prepare the holding of the data in the transmission/reception buffer 12. Therefore, when transmission data generated in the central processing unit 3 is written in the transmission/reception buffer 12 of the microcomputer 1, a flag is set in the transmission flag 14 to inhibit another data holding of the transmission/reception buffer 12. When the transmission data written in the transmission/reception buffer 12 is read out to the host computer 2, the flag of the transmission flag 14 is reset under the control of the host interface control circuit 15 to permit a data holding of the transmission/reception buffer 12. Also, a flag is set in the transmission flag 14 each time transmission data generated in the central processing unit 3 is written in the transmission/reception buffer 12. However, in cases where the transmission data is not read out from the transmission/reception buffer 12 because of the occurrence of an abnormal state in the microcomputer 1, the flag of the transmission flag 14 is not reset.

Therefore, in a step ST8, before the central processing unit 3 accesses to the transmission/reception buffer 12 to read out data held in the transmission/reception buffer 12 or to write data in the transmission/reception buffer 12, regardless of whether each of the flags of the reception flag 13 and the transmission flag 14 is set, values of the reception flag 13 and the transmission flag 14 are cleared under the control of the host interface control circuit 15 operated according to a clear instruction of the central processing unit 3, so that the reception flag 13 and the transmission flag 14 are reset.

Thereafter, in a step ST9, it is judged whether or not preceding transmission data to be transmitted to the host computer 26 exists in the transmission/reception buffer 12. In cases where preceding transmission data to be transmitted to the host computer 2 exists, the central processing unit 3 waits for the reading-out of the transmission data. In contrast, in cases where preceding transmission data to be transmitted to the host computer 2 does not exist, in a step ST10, it is judged according to the change-over signal whether or not the accessing of the central processing unit 3 to the transmission/reception buffer 12 is performed at only lower 8 bits. In cases where the accessing to the transmission/reception buffer 12 is performed at only the lower 8 bits, in a step ST 11, the central processing unit 3 performs a write-accessing to the transmission/reception buffer 12 and writes current transmission data of 8-bit width in the lower 8 bits (bit No. 0 to 7) of the transmission/reception buffer 12. Thereafter, in a step ST12, it is judged according to a value of the transmission flag 38 whether or not next transmission data to be transmitted to the host computer 2 is generated in the central processing unit 3. In cases where next transmission data is generated in the central processing unit 3, the procedure returns to the step ST9. In contrast, in cases where no next transmission data is generated in the central processing unit 3, the procedure is completed.

In contrast, in cases where it is judged in the step ST10 that the accessing to the transmission/reception buffer 12 is not performed at the lower 8 bits, in a step ST13, the central processing unit 3 performs a write-accessing to the transmission/reception buffer 12 and write current transmission data of a 16-bit width in the all 16 bits of the-transmission/reception buffer 12. Thereafter, in a step ST14, it is judged according to a value of the transmission flag 38 whether or not next transmission data to be transmitted to the host computer 2 is generated in the central processing unit 3. In cases where next transmission data is generated in the central processing unit 3, the procedure returns to the step ST9. In contrast, in cases where no next transmission data is generated in the central processing unit 3, the procedure is completed.

As is described above, in cases where data transmission/reception is performed between the host computer 2 and the microcomputer 1, as shown in timing charts of FIG. 5(a), FIG. 5(b), FIG. 6(a) and FIG. 6(b), a handshaking is established between the host computer 2 and the microcomputer 1 under the control of the central processing unit 3.

Figure 5:
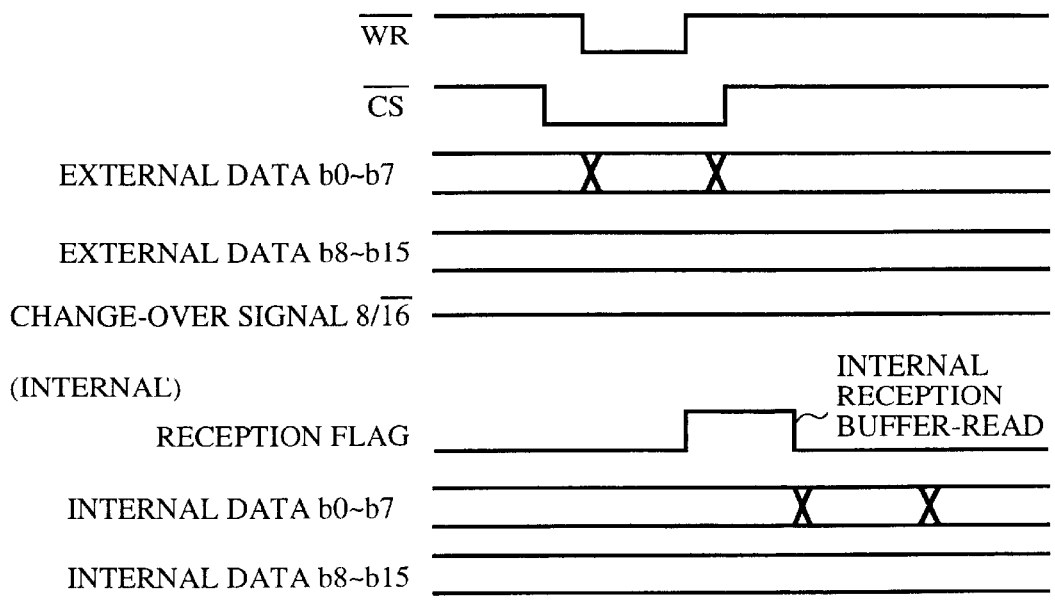
FIG. 5(a) is a timing chart of signals and reception data in cases where 8-bit reception data is transmitted from the host computer to the microcomputer.
FIG. 5(b) is a timing chart of signals and transmission data in cases where 8-bit transmission data is transmitted from the microcomputer to the host computer.
Figure 5:
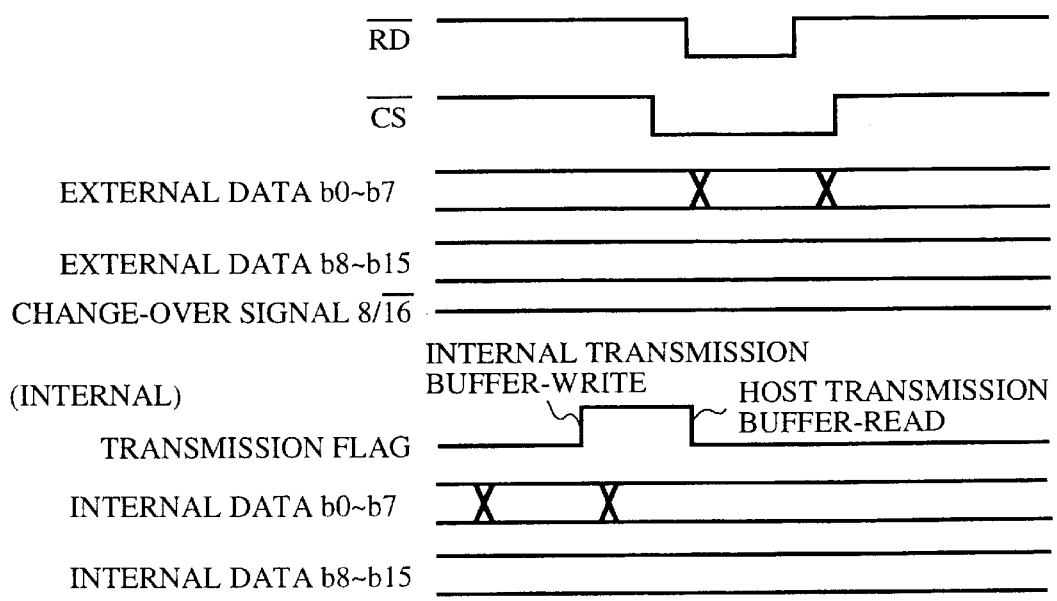
Figure 6:
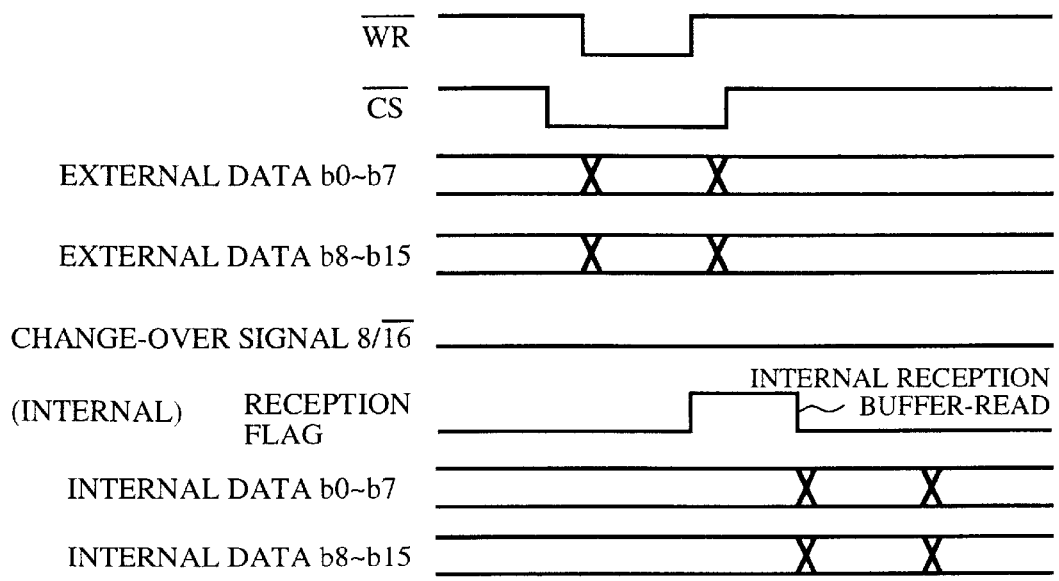
FIG. 6(a) is a timing chart of signals and reception data in cases where 16-bit reception data is transmitted from the host computer to the microcomputer.
FIG. 6(b) is a timing chart of signals and transmission data in cases where 16-bit transmission data is transmitted from the microcomputer to the host computer.
Figure 6:
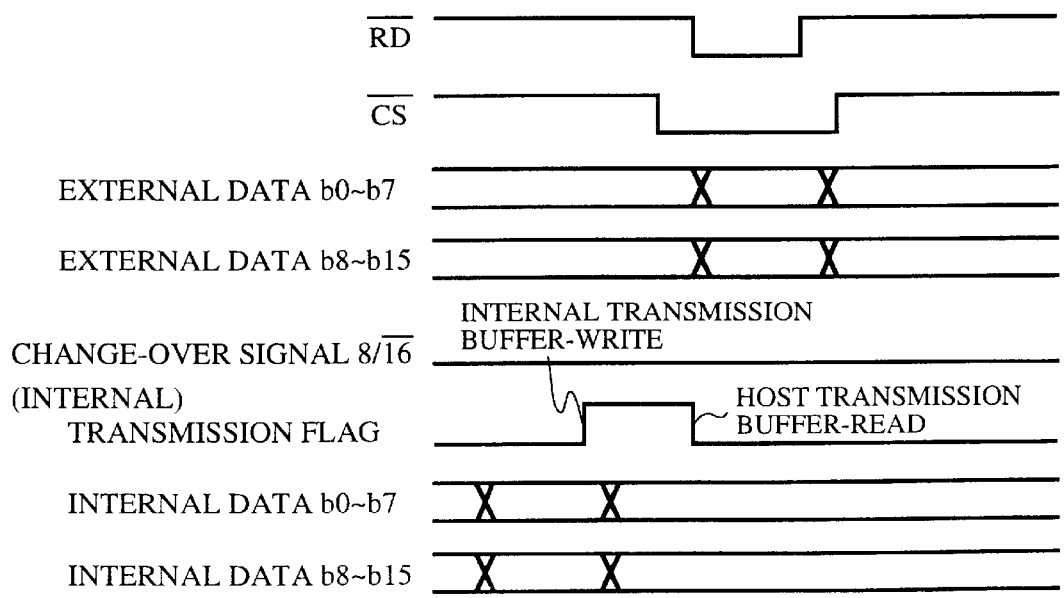

FIG. 5(a) is a timing chart of signals and reception data in cases where 8-bit reception data is transmitted from the host computer 2 to the microcomputer 1. FIG. 5(b) is a timing chart of signals and transmission data in cases where 8-bit transmission data is transmitted from the microcomputer 1 to the host computer 2. FIG. 6(a) is a timing chart of signals and reception data in cases where 16-bit reception data is transmitted from the host computer 2 to the microcomputer 1. FIG. 6(b) is a timing chart of signals and transmission data in cases where 16-bit transmission data is transmitted from the microcomputer 1 to the host computer 2.

Also, a sign $\overline{WR}$ denotes the external write control signal, a sign $\overline{RD}$ denotes the external read control signal, a sign $\overline{CS}$ denotes the external chip selection signal, external data b0~b7 denotes lower 8-bit data transmitting through the external data bus, external data b8~b16 denotes upper 8-bit data transmitting through the external data bus, internal data b0~b7 denotes lower 8-bit data transmitting through the internal data bus, and internal data b8~b16 denotes upper 8-bit data transmitting through the internal data bus.

As shown in FIG. 5(a), in cases where 8-bit reception data is transmitted from the host computer 2 to the microcomputer 1, the host computer 2 sets the change-over signal to a high level, sets 8-bit reception data on the external data bus, asserts the external chip selection signal set to a low level, and drives the external write control signal to a low level.

In the microcomputer 1, the transmission/reception buffet 12 latches and holds the 8-bit data placed in the lower 8 bits of the external data bus according to the external chip selection signal and the external write control signal, and a flag is set in the reception flag 13 under the control of the host interface control circuit 15.

Thereafter, the procedure shown in the flow chart of FIG. 3 is performed in the central processing unit 3, Therefore, the flag of the reception flag 13 is cleared in response to the read-out of the lower 8-bit data from the transmission/reception buffer 12, the lower 8-bit data read out from the transmission/reception buffer 12 is output to the internal data bus 11, the central processing unit 3 reads the lower 8-bit data placed on the internal data bus 11, so that a prescribed processing is performed by the central processing unit 3.

Also, as shown in FIG. 6(a), in cases where 16-bit reception data is transmitted from the host computer 2 to the microcomputer 1, the host computer 2 sets the 16-bit reception data on the external data bus, the 16-bit reception data is held in the transmission/reception buffer 12 and is output to the internal data bus 11, and the central processing unit 3 reads the 16-bit reception data. In this case, the fetching of the transmission/reception buffer 12 for 8-bit data in a write period, in which the external write control signal and the chip selection signal are set to the low level, is repeated twice to hold lower 8-bit data b0~b7 and upper 8-bit data b8~b15 composing the 16-bit reception data in the transmission/reception buffer 12. The others are the same as those shown in FIG. 5(a).

As shown in FIG. 5(b), in cases where 8-bit transmission data is transmitted from the microcomputer 1 to the host computer 2, the microcomputer 1 outputs transmission data to lower 8 bits of the internal data bus 11, and the 8-bit transmission data is held in the lower 8 bits of the transmission/reception buffer 12. Also, an internal read/write signal and an internal chip selection signal are generated in the central processing unit 3 and are sent to the transmission/reception buffer 12. In this case, a value indicating a set state is written in the transmission flag 14 under the control of the host interface control circuit 15.

In the host computer 2, the reading-out from the transmission/reception buffer 12 is performed. In detail, the external chip selection signal set to a low level is asserted, and the external read control signal is driven to a low level. The transmission/reception buffer 12 outputs 16-bit data, in which the 8-bit transmission data is placed in the lower 8 bits, to the external data bus in a read period in which the external chip selection signal and the external read control signal are set to the low level.

Thereafter, in an established state of the handshaking between the host computer 2 and the microcomputer 1, the host computer 2 drives the external read control signal to the high level, reads the 8-bit transmission data placed in the lower 8 bits of the external data bus in response to the external read control signal set to the high level, and performs a prescribed operation according to the 8-bit transmission data placed in the lower 8 bits.

Also, as shown in FIG. 6(b), in cases where 16-bit transmission data is transmitted from the microcomputer 1 to the host computer 2, the microcomputer 1 outputs transmission data to the all 16 bits of the internal data bus 11, the 16-bit transmission data is held in the transmission/reception buffer 12 and is outputs from the transmission/reception buffer 12 to the external data bus, and the host computer 2 reads all the 16-bit data of the external data bus. In this case, the reading-out from the transmission/reception buffer 12 for 8-bit data in a read period, in which the external read control signal and the chip selection signal are set to the low level, is repeated twice to read out lower 8-bit data b0~b7 and upper 8bit data b8~b15 composing the 16-bit transmission data from the transmission/reception buffer 12 to the external data bus. The others are the same as those shown in FIG. 5(b).

Accordingly, in the first embodiment, in cases where the reception data, which is transmitted from the host computer 2 and is written in the reception/transmission buffer 12, is not read out to the central processing unit 3 in a preceding communication or in cases where the transmission data, which is generated in the central processing unit 3 and is written in the reception/transmission buffer 12, is not read out to the host computer 2 in a preceding communication, though the preceding communication between the host computer 2 and the microcomputer 1 ended abnormally, because values of the transmission flag 14 and the reception flag 13 are cleared (or reset) in software-reset under the control of the central processing unit 3 before a current communication is performed, data transmission/reception in the current communication can be normally performed. Here, the software-reset denotes the processing that the host interface control circuit 15 clears the values of the transmission flag 14 and the reception flag 13 according to the clear instruction of the central processing unit 3.

Also, in the first embodiment, the internal data bus 11 and the transmission/reception buffer 12 are formed to correspond to the 16-bit bus width which is twice the 8-bit bus width of the external data bus, the central processing unit 3 selects either the 8-bit bus width corresponding to the external data bus or the 16-bit bus width corresponding to the internal data bus 11 according to the change-over signal input from the outside, and the central processing unit 3 accesses to the transmission/reception buffer 12 at the selected bus width. Therefore, the processing time required in the microcomputer 1 can be considerably shortened in comparison with a case that the internal data bus 11 and the transmission/reception buffer 12 are formed to correspond to the same 8-bit bus width as that of the external data bus. In particular, because the used bus width in the accessing of the central processing unit 3 to the transmission/reception buffer 12 is changed over according to the change-over signal input from the outside, the used bus width can be set to a value suitable for a type of data transmitting through the external data bus and the internal data bus 11 and/or used states of the external data bus and the internal data bus. Therefore, a processing speed for the data can be improved as compared with the accessing at a fixed bus width. Also, the bus width of the external data bus can be easily widened to 16-bit bus width if the need arises.

In the first embodiment, the internal data bus 11 and the transmission/reception buffer 12 are formed to correspond to the 16-bit bus width which is twice the 8-bit bus width of the external data bus. However, it is preferred that the internal data bus 11 and the transmission/reception buffer 12 are formed to correspond to a bus width which is N times (N is a positive integral number) that of the external data bus.

EMBODIMENT 2

Figure 7:
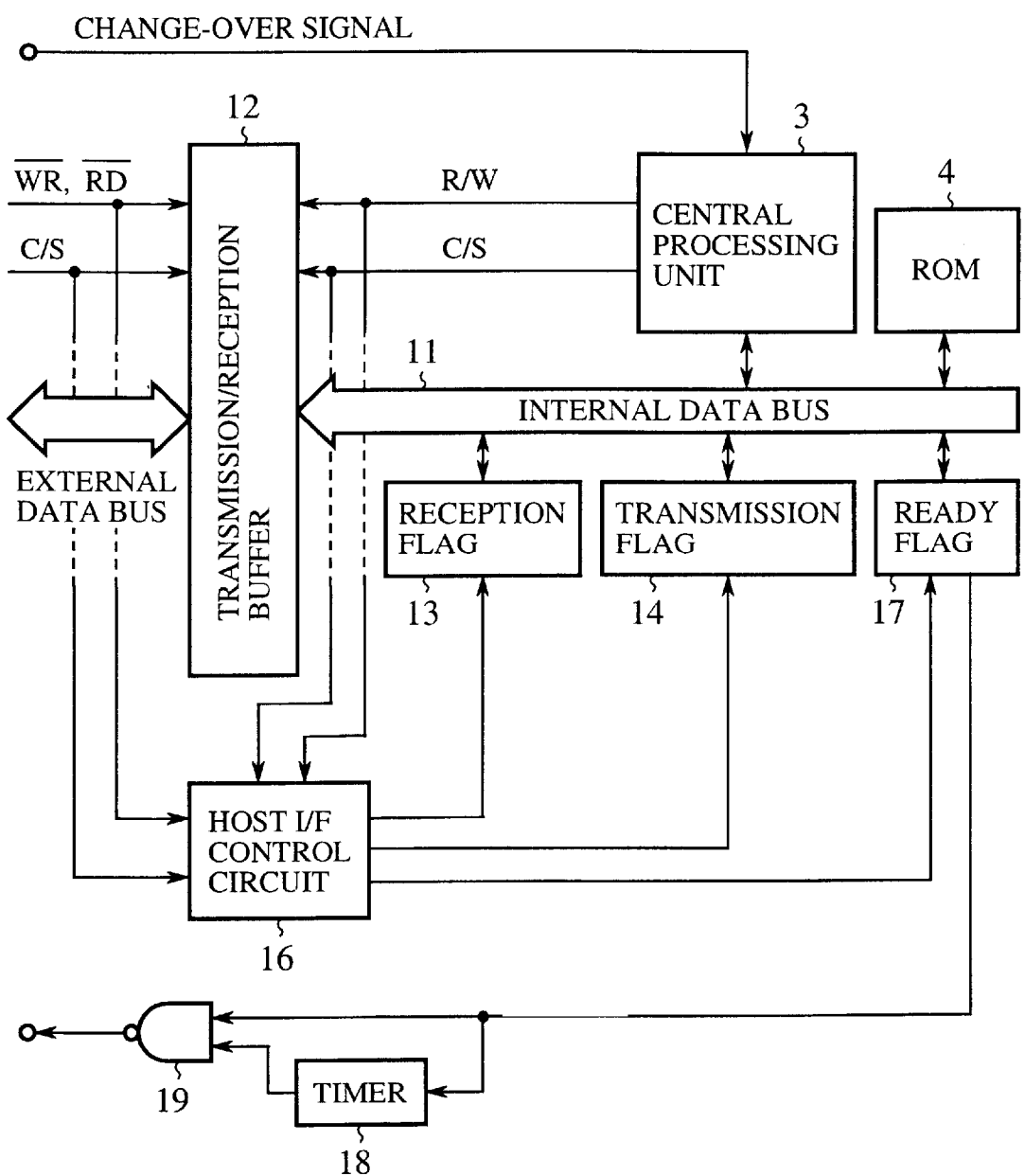
FIG. 7 is a block diagram showing the configuration of both a host interface circuit of the microcomputer and a periphery of the host interface circuit according to a second embodiment of the present invention.

FIG. 7 is a block diagram showing the configuration of both the host interface circuit 10 of the microcomputer 1 and a periphery of the host interface circuit 10 according to a second embodiment of the present invention. In FIG. 7, a reference sign 17 indicates a ready flag, connected with the internal data bus 11, for having a value indicating a set state or a reset state, outputting an access inhibiting signal of a high level in response to the value of the set state and outputting an access inhibiting signal of a low level in response to the value of the reset state. A reference sign 16 indicates a host interface control circuit for performing a flag set control or a flag reset control for each of the reception flag 13, the transmission flag 14 and the ready flag 17 according to a data holding state of the transmission/reception buffer 12 to change the value of each of the reception flag 13, the transmission flag 14 and the ready flag 17. A reference sign 18 indicates a timer for receiving the access inhibiting signal from the ready flag 17, measuring an elapsed time starting from the reception of the access inhibiting signal of the high level, outputting a time-out signal of a high level in a prescribed time-period starting from the reception of the access inhibiting signal of the high level and outputting a time-out signal of a low level after the prescribed time-period passes. A reference sign 19 indicates a logical circuit for receiving the access inhibiting signal from the ready flag 17, receiving the time-out signal from the timer 18, outputting a ready signal of a low level in a time-period that both the access inhibiting signal and the time-out signal are set to the high level and outputting a ready signal of a high level in a time-period that both the access inhibiting signal and the time-out signal are not set to the high level. The ready signal of the high level indicates a ready state of the transmission/reception buffer 12 to permit the accessing to the transmission/reception buffer 12 from the outside, and the ready signal of the low level indicates a busy state of the transmission/reception buffer 12 to inhibit the accessing to the transmission/reception buffer 12 from the outside. Therefore, the ready signal of the low level denotes a busy signal. Also, because the access inhibiting signal of the high level indicates the busy state of the transmission/reception buffer 12, the access inhibiting signal of the high level denotes the busy signal. The other configuration is the same as that of the first embodiment, so that the description for the other configuration is omitted.

Next, an operation is described.

When current data (transmission data or reception data) transmitted from the host computer 2 or generated in the central processing unit 3 is written in the transmission/reception buffer 12, the host interface control circuit 16 controls the ready flag 17 to make the ready flag 17 have a value of a set state, so that an access inhibiting signal of a high level is output from the ready flag 17 to the timer 18 and the logical circuit 19. Therefore, an elapsed time after the reception of the access inhibiting signal is measured in the timer 18, a time-out signal of a high level is output from the timer 18 to the logical circuit 19, and a ready signal of a low level, which denotes a busy state of the transmission/reception buffer 12, is output from the logical circuit 19.

In a normal operation, the current data held in the transmission/reception buffer 12 is read out to the host computer 2 or the central processing unit 3 through the external data bus or the internal-data bus 11 in a normal operation, the host interface control circuit 16 clears the value of the ready flag 17 to put the ready flag 17 in a reset state, an access inhibiting signal of a low level is output from the ready flag 17 to the timer 18 and the logical circuit 19, the measuring of the elapsed time in the timer 18 is stopped, a ready signal of a high level, which denotes a ready state of the transmission/reception buffer 12, is output from the logical circuit 19. Therefore, a data writing in the transmission/reception buffer 12 becomes possible.

In contrast, in cases where the current data held in the transmission/reception buffer 12 is not read out to either the host computer 2 or the central processing unit 3 because an abnormal state (an accident or error) occurs in the microcomputer 1, the outputting of the access inhibiting signal set to the high level to the timer 18 and the logical circuit 19 is continued, so that the measuring of the elapsed time in the timer 18 is continued.

Figure 8:
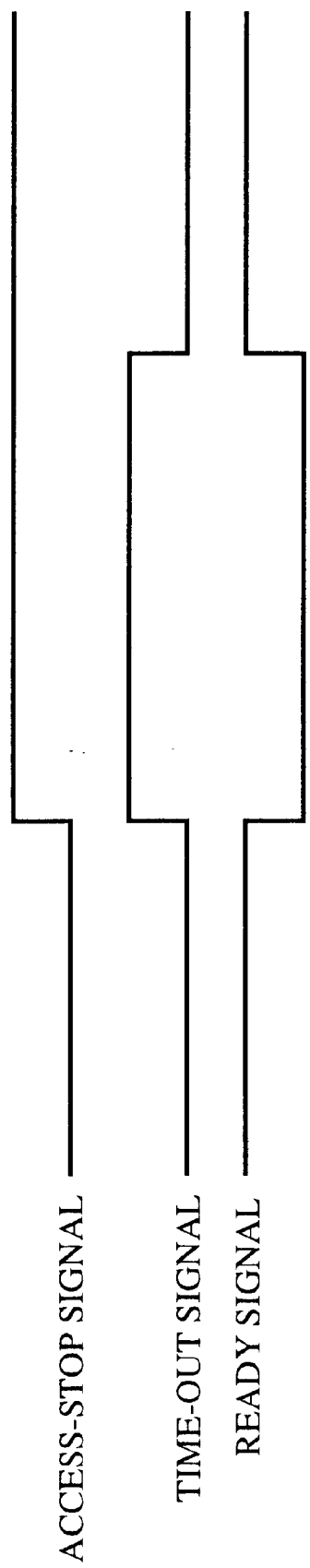
FIG. 8 is a time chart of an access inhibiting signal, a time-out signal and a ready signal in an abnormal operation according to the second embodiment.

FIG. 8 is a time chart of the access inhibiting signal, the time-out signal and the ready signal in the abnormal state.

As shown in FIG. 8, when a prescribed time-period passes after the reception of the access inhibiting signal set to the high level, the time-out signal is driven to the low level in the timer 18, so that a ready signal set to a high level is output from the logical circuit 19. Therefore, even though the current data held in the transmission/reception buffer 12 is not read out to either the host computer 2 or the central processing unit 3 in the abnormal state, a data writing in the transmission/reception buffer 12 becomes possible, and next data generated in the central processing unit 3 or transmitted from the host computer 2 can be written in the transmission/reception buffer 12 in place of the current data.

Accordingly, in the second embodiment, because the ready signal of the low level (denoting a busy signal) is output according to the access inhibiting signal of the ready flag 17 only in the prescribed time-period measured in the timer 18, the data writing in the transmission/reception buffer 12 becomes possible after the prescribed time-period passes. As a result, even though the transmission/reception buffer 12 of the microcomputer 1 is put to an abnormal state during the prescribed time-period, because the transmission/reception buffer 12 is released from the abnormal state after the prescribed time-period to be returned to the normal state, the host computer 2 can transmit next data to the microcomputer 1 or read out next data from the microcomputer 1 according to the ready signal changed to the high level.

EMBODIMENT 3

Figure 9:
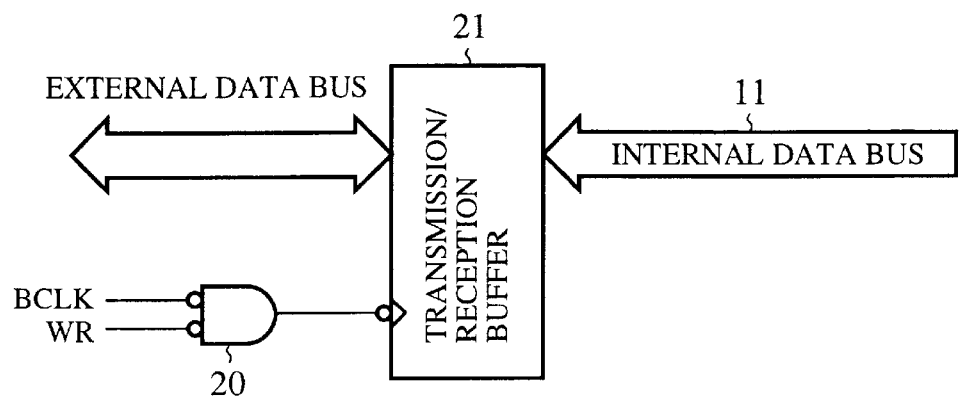
FIG. 9 is a block diagram showing the configuration of both a transmission/reception buffer of the microcomputer. and a periphery of the transmission/reception buffer according to a third embodiment of the present invention.

FIG. 9 is a block diagram showing the configuration of both a transmission/reception buffer of the microcomputer 1 and a periphery of the transmission/reception buffer according to a third embodiment of the present invention. In FIG. 9, a reference sign 20 indicates a logical circuit (functioning as a latch signal producing circuit) for receiving an external bus clock signal BCLK (functioning as a referential bus clock signal for the data transmission/reception in the external data bus) and the external write control signal WR from the external data bus and outputting a latch signal of a high level in a time-period in which the external bus clock signal BCLK and the external write control signal WR are set to a low level together. A reference sign 21 indicates a transmission/reception buffer for latching external data of the external data bus at a timing of a trailing edge of the latch signal and holding the external data latched. The other configuration is the same as that of the second embodiment, so that the description for the other configuration is omitted.

Next, an operation is described with reference to FIG. 10.

Figure 10:
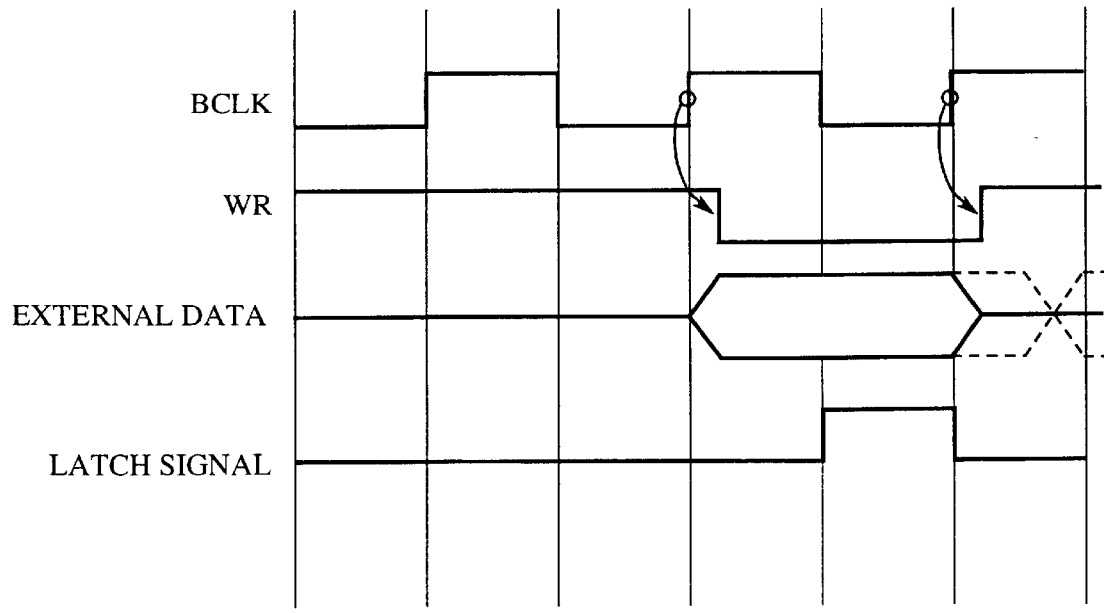
FIG. 10 is a timing chart of an external bus clock signal BCLK, an external write control signal WR, a latch signal and external data according to the third embodiment.

FIG. 10 is a timing chart of an external bus clock signal BCLK, an external write control signal WR, a latch signal and external data.

As shown in FIG. 10, in a state that external data transmitted from the host computer 2 and an external bus clock signal BCLK are output to the external data bus, when an external write control signal WR is driven to a low level under the control of the host computer 2, a latch signal set to a high level is produced in the logical circuit 20 in synchronization with a trailing edge of the external bus clock signal BCLK. A time-period of the external write control signal WR maintained to the low level is called a write period, and the level of the latch signal is changed in synchronization with the level change of the external bus clock signal BCLK in the write period. Thereafter, when the external bus clock signal BCLK set to the low level is changed to a high level, the latch signal is changed to a low level, and the transmission/reception buffer 21 latches the external data of the external data bus in synchronization with a trailing edge of the latch signal (or a leading edge of the external bus clock signal BCLK) and holds the external data. In this case, the transmission/reception buffer 21 latches and holds the external data of the external data bus each time the latch signal is changed to the low level.

Thereafter, when the external write control signal WR is driven to a high level under the control of the host computer 2, the transmission/reception buffer 21 holds only the external data of the external data bus finally latched. The other operations are the same as that of the second embodiment, so that the description of the other operations are omitted.

Accordingly, in the third embodiment, the latch signal set to the high level is produced in the logical circuit 20 when the external bus clock signal BCLK and the external write control signal WR are set to the low level together, and the transmission/reception buffer 21 latches and holds the data of the external data bus in synchronization with a trailing edge of the latch signal. Therefore, the transmission/reception buffer 21 can latch the data of the external data bus at a timing of a leading edge of the external bus clock signal BCLK. As a result, even though the data holding of the transmission/reception buffer 21 at an edge timing of the external write control signal is not guaranteed in the microcomputer 1, in other words, even though the data holding of the transmission/reception buffer 21 at an edge timing of the external bus clock signal BCLK is only guaranteed in the microcomputer 1, the data of the external data bus can be reliably latched and held in the transmission/reception buffer 21, so that it is not required to use a specific host computer as the host computer 2. Therefore, the system composed of the host computer 2 and the microcomputer 1 can be easily manufactured at a cheap cost.

EMBODIMENT 4

Figure 11:
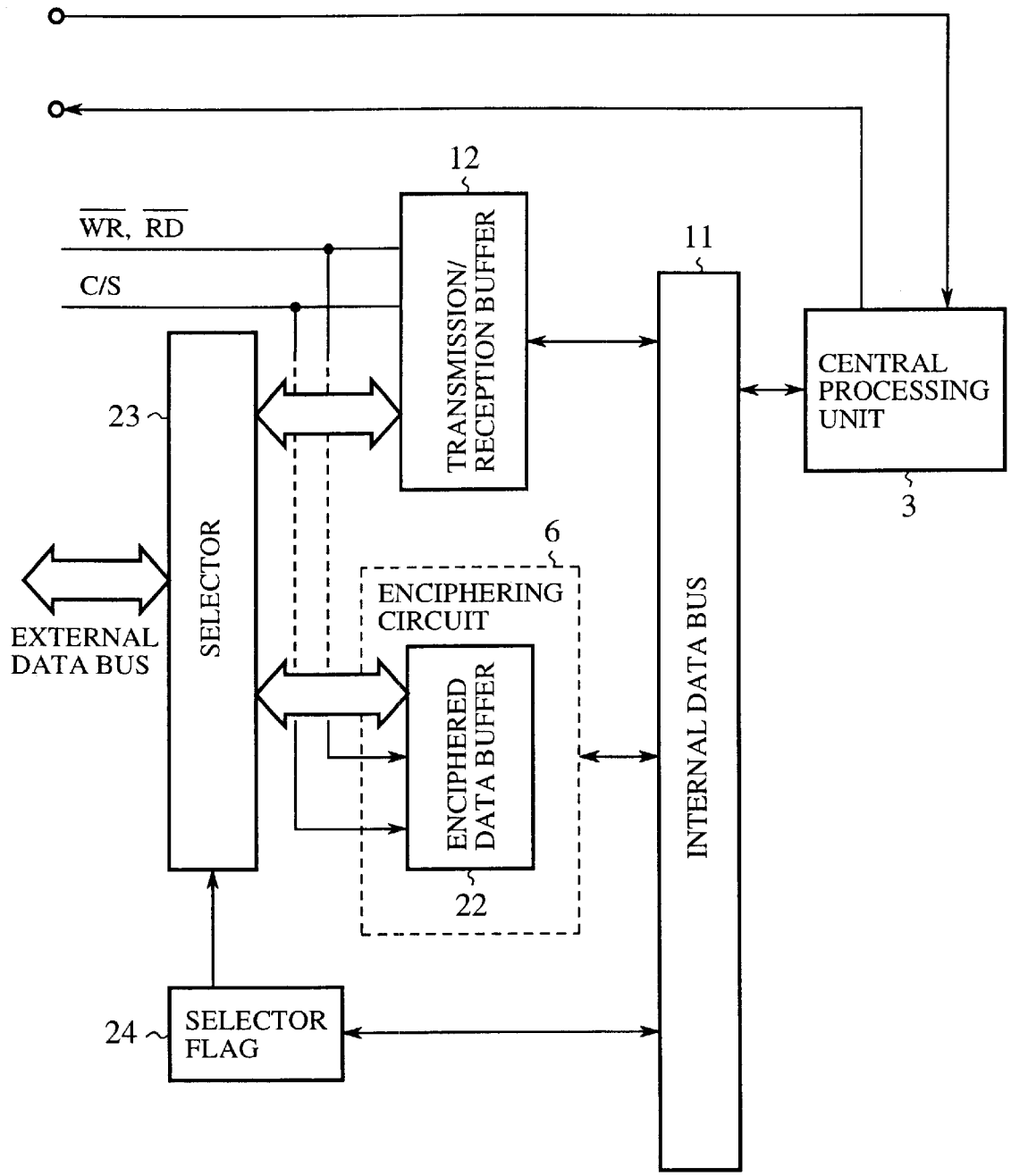
FIG. 11 is a block diagram showing the configuration of both a host interface circuit of the microcomputer and a periphery of the host interface circuit according to a fourth embodiment of the present invention.
Figure 12:
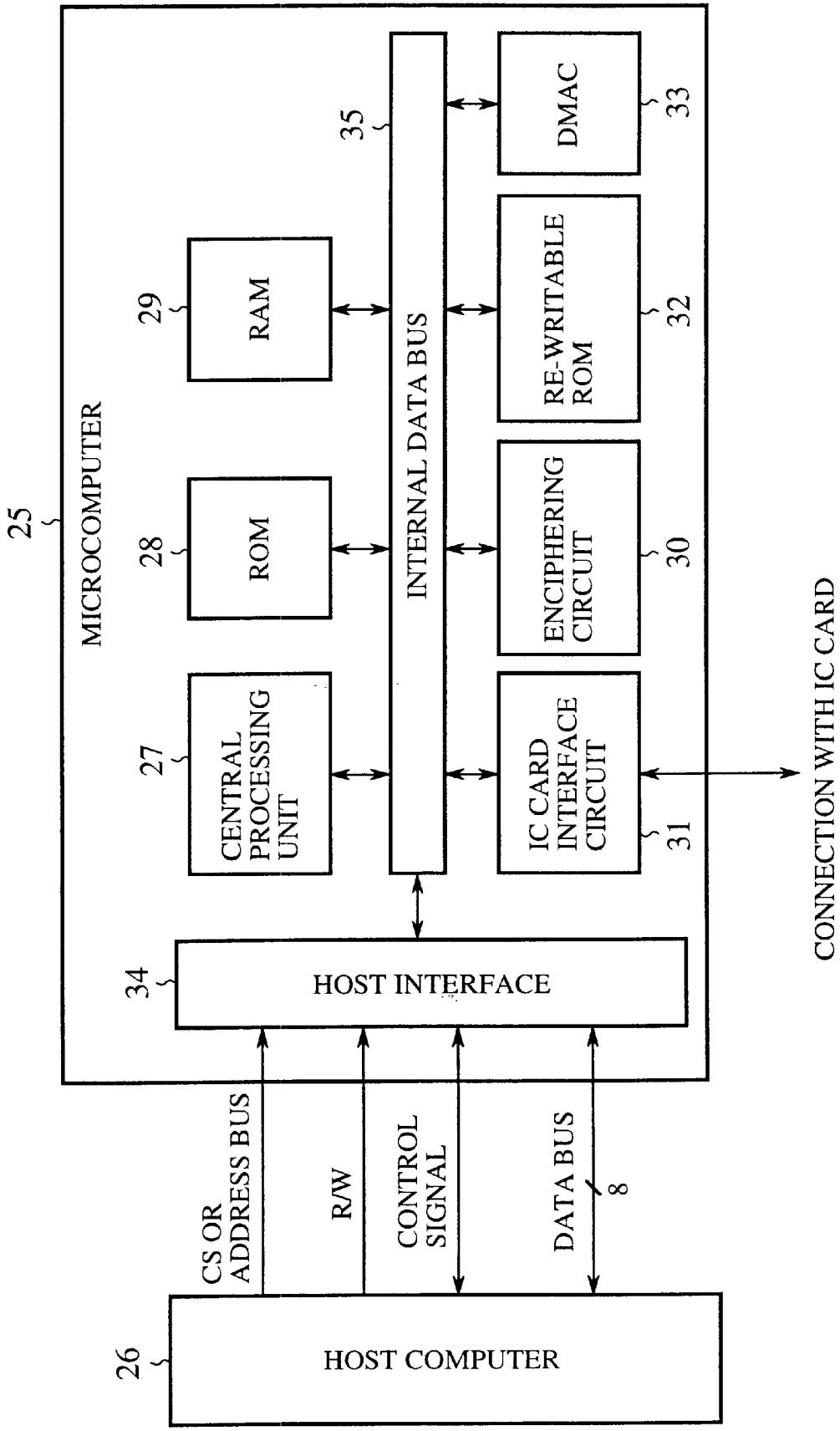
FIG. 12 is a block diagram showing the configuration of a conventional system composed of a conventional microcomputer and a host computer connected with the conventional microcomputer.
Figure 13:
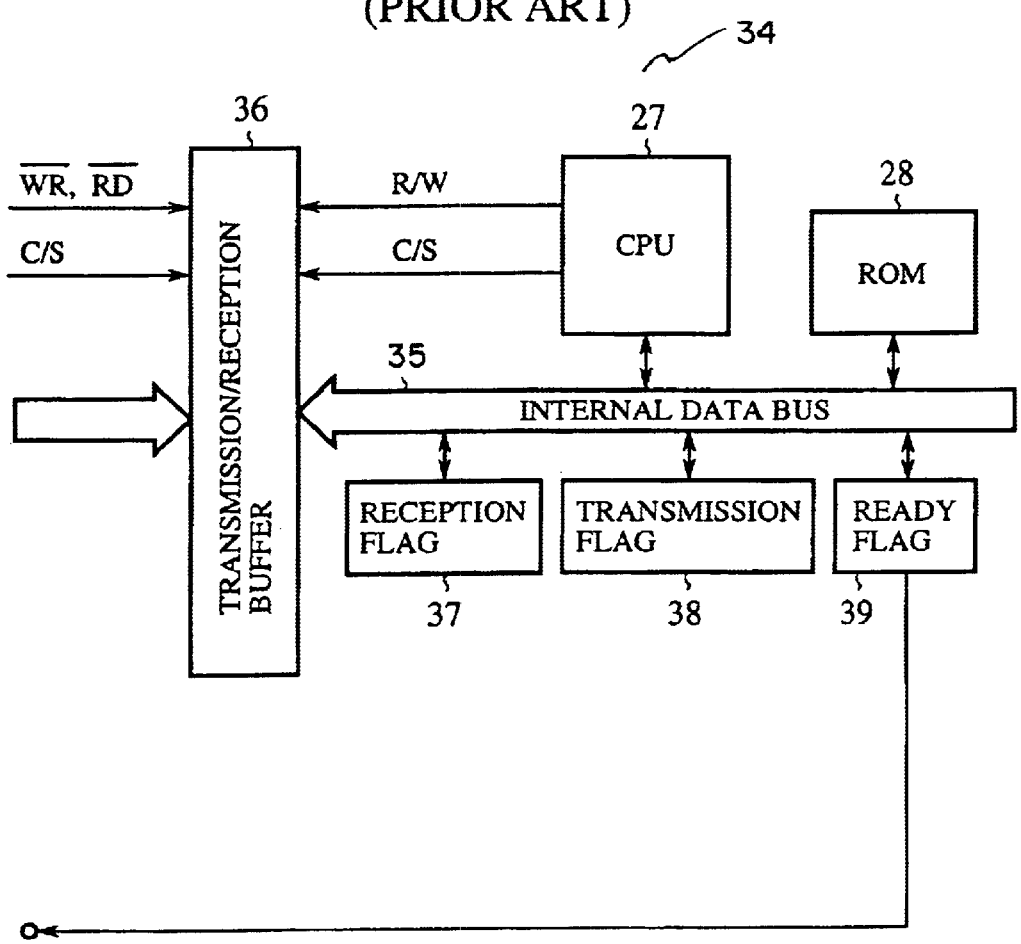
FIG. 13 is a block diagram showing the configuration of a host interface circuit of the conventional microcomputer and a periphery of the host interface circuit.
Figure 14:
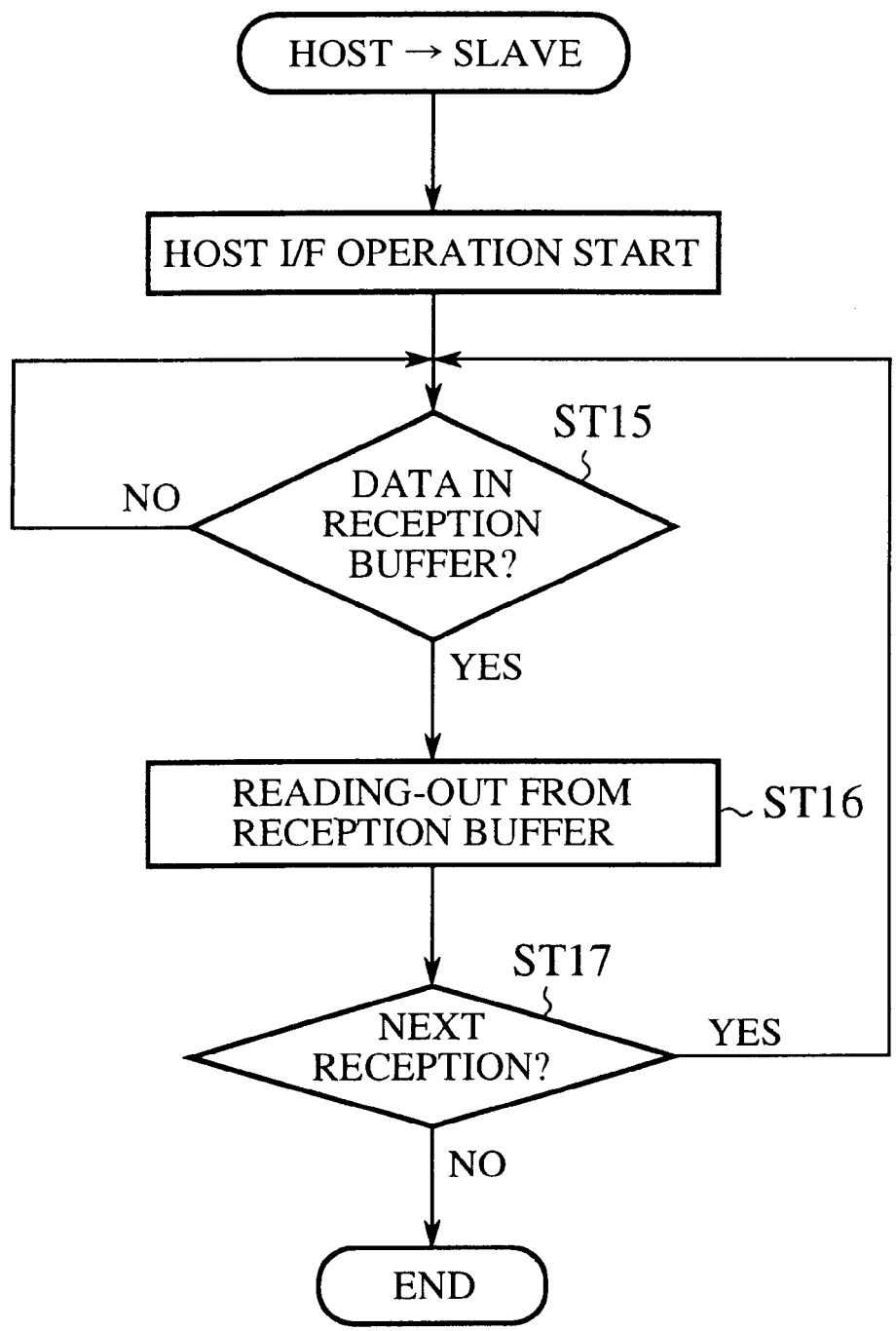
FIG. 14 is a flow chart showing the procedure performed in the conventional system shown in FIG. 12 and FIG. 13 according to a program executed in a central processing unit in cases where data is written in a transmission/reception buffer.
Figure 15:
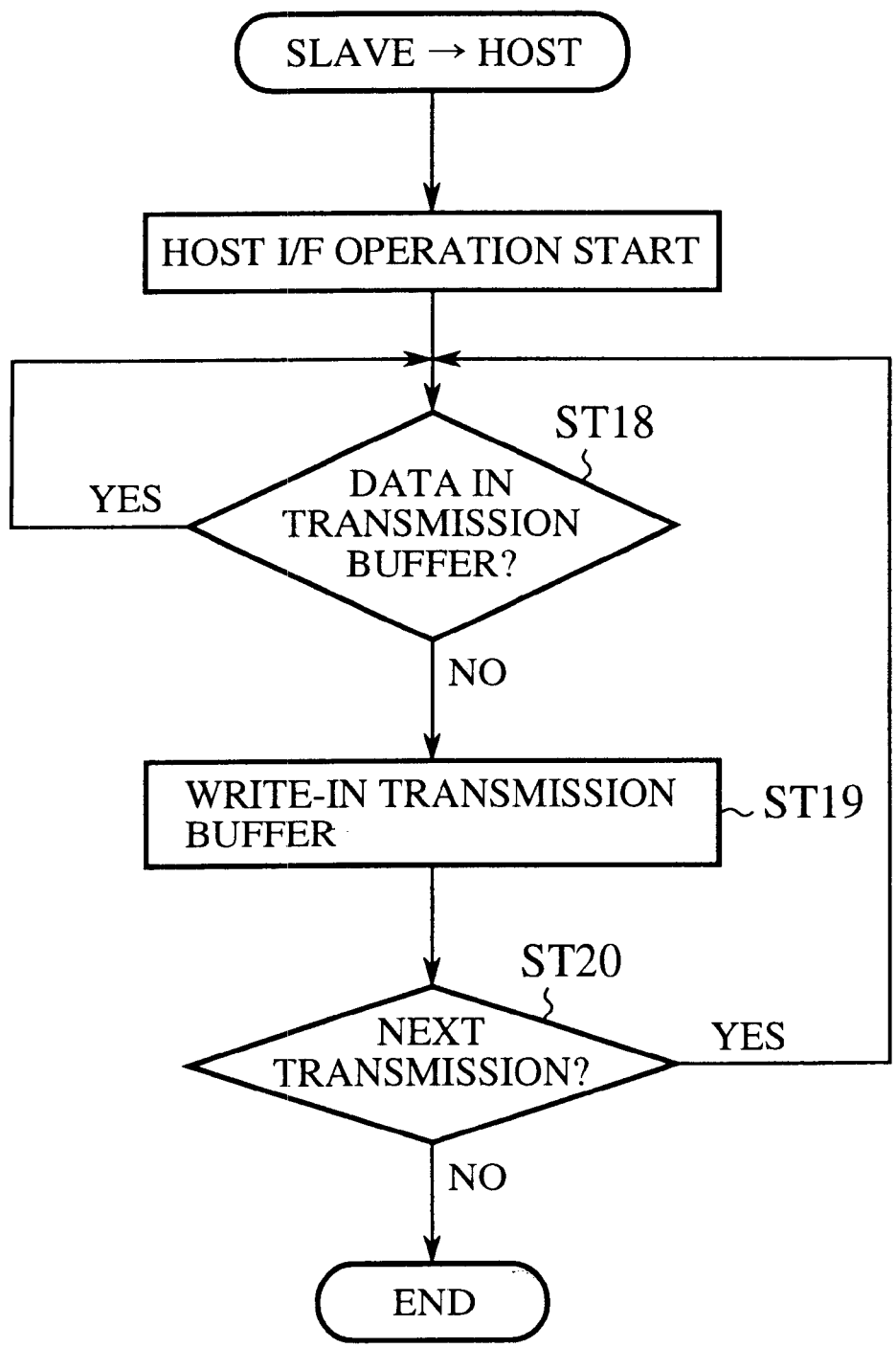
FIG. 15 is a flow chart showing the procedure performed in the conventional system shown in FIG. 12 and FIG. 13 according to a program executed in the central processing unit in cases where data to be transmitted to the host computer is generated in the central processing unit.

FIG. 11 is a block diagram showing the configuration of both the host interface circuit 10 of the microcomputer 1 and a periphery of the host interface circuit 10 according to a fourth embodiment of the present invention. In FIG. 11, a reference sign 22 indicates an enciphered data buffer (functioning as a second transmission/reception buffer), arranged in the enciphering circuit 6, for storing enciphered data or data to be enciphered. A reference sign 23 indicates a selector for selecting either the enciphered data buffer 22 or the transmission/reception buffer 12 as a buffer to be connected with the external data bus. A reference sign 24 indicates a selector flag, connected with the internal data bus 11, for having a value indicating a set state or a reset state and outputting a selection signal corresponding to the value to the selector 23 to control the selector 23 according to the selection signal. The other configuration is the same as that of the third embodiment, so that the description of the other configuration is omitted.

Next, an operation is described.

In cases where the central processing unit 3 judges according to a control signal sent from the outside that data to be received from the host computer 2 is enciphered, a flag set instruction is sent from the central processing unit 3 to the selector flag 24 through the internal data bus 11 to make the selector flag 24 in a set state. Therefore, the selector 23 is controlled according to a selection signal sent from the selector flag 24 to connect the enciphered data buffer 22 with the external data bus. In this connection state, when the host computer 2 transmits enciphered data to the external data bus, the enciphered data of the external data bus is directly written in the enciphered data buffer 22 through the selector 23 without being held in the transmission/reception buffer 12, a deciphering processing is immediately performed for the enciphered data in the enciphering circuit 6. Therefore, the central processing unit 3 can use the deciphered data sent from the enciphering circuit 6.

Also, in cases where data to be enciphered is generated in the central processing unit 3, the central processing unit 3 writes the data in the enciphered data buffer 22 through the internal data bus 11 to encipher the data, and a flag set instruction is sent from the central processing unit 3 to the selector flag 24 through the internal data bus 11 to make the selector flag 24 in a set state. Therefore, the selector 23 is controlled according to a selection signal sent from the selector flag 24 to connect the enciphered data buffer 22 with the external data bus. In this connection state, a read-out signal is output from the central processing unit 3 to the host computer 2, so that a data read-out processing for the enciphered data held in the enciphered data buffer 22 is performed by the host computer 2.

In cases where a flag reset instruction is sent from the central processing unit 3 to the selector flag 24 to clear the selector flag 24, the selector 23 is controlled according to a selection signal sent from the selector flag 24 to connect the transmission/reception buffer 12 with the external data bus, and the same operations as those of the third embodiment are performed.

Accordingly, in the fourth embodiment, because either the enciphered data buffer 22 or the transmission/reception buffer 12 is selected according to a state (or a value) of the selector flag 24 as a buffer to be connected with the external data bus, in cases where the enciphered data of the host computer 2 is, for example, written in the microcomputer 1, the enciphered data of the external data bus can be directly written in the enciphered data buffer 22 to immediately decipher the enciphered data. Therefore, in comparison with a case that the enciphered data is once held in the transmission/reception buffer 12 and is transferred from the transmission/reception buffer 12 to the enciphered data buffer 22, a data processing time for the enciphered data can be shortened by a time required for a transferring processing.

What is claimed is:

1. A microcomputer, including a central processing circuit, storing means, and an internal data bus connecting the central processing circuit, the storing means and a transmission/reception buffer being arranged between an external data bus and the internal data bus, comprising:

a reception flag which is set according to a write-in to the transmission/reception buffer from an outside and is reset according to a read-out from the transmission/reception buffer to the central processing circuit; and a transmission flag which is set according to a write-in to the transmission/reception buffer from the central processing circuit and is reset according to a read-out from the transmission/reception buffer to the outside, wherein the central processing circuit accesses to the transmission/reception buffer after the central processing circuit resets the reception flag and the transmission flag.

2. A microcomputer according to claim 1, wherein the internal data bus and the transmission/reception buffer are formed to correspond to a bus width which is N times (N is a positive integral number) that of the external data bus, and the central processing circuit selects either the bus width of the internal data bus or the bus width of the external data-bus according to the change-over signal input from the outside to access to the transmission/reception buffer at the selected bus width.

3. A microcomputer according to claim 1, the microcomputer further comprises:

a latch signal producing circuit for receiving a referential clock signal used for a data transmission/reception and a write control signal indicating a write period from the external data bus and outputting a latch signal at an edge timing of the referential clock signal in the write period, wherein the transmission/reception buffer latches data from the external data bus according to the latch signal output from the latch signal producing circuit.

4. A microcomputer according to claim 1, the microcomputer further comprises:

an enciphering circuit, having a second transmission/reception buffer, for enciphering or deciphering data stored in the second transmission/reception buffer;

a selection, connected with the external data bus, for selecting either the transmission/reception buffer or the second transmission/reception buffer as an internal connected buffer to directly connect the external data bus and the internal connected buffer; and a selector flag, in which a value is written by the central processing unit, for outputting a selector signal corresponding to the value to the selector to make the selector determine the internal connected buffer according to the selector signal.

5. A microcomputer, including a central processing circuit, storing means, an internal data bus connecting the central processing circuit, the storing means and a transmission/reception buffer being arranged between an external data bus and the internal data bus, comprising:

a ready flag for outputting a busy signal in cases where data is held in the transmission/reception buffer;

a timer for measuring an elapsed time starting from a time that the busy signal is output by the ready flag and outputting a time-out signal at a time that the elapsed time reaches a prescribed value; and a logical circuit for outputting the busy signal output from the ready flag to an outside in a prescribed time-period extending from the outputting of the busy signal performed by the ready flag to the outputting of the time-out signal performed by the timer.

6. A microcomputer according to claim 5, wherein the internal data bus and the transmission/reception buffer are formed to correspond to a bus width which is N time (N is a positive integral number) that of the external data bus, and the central processing circuit selected either the bus width of the internal data bus or the bus width of the external data bus according to a change-over signal input from the outside to access to the transmission/reception buffer at the selected bus width.

7. A microcomputer according to claim 5, the microcomputer further comprises:

a latch signal producing circuit for receiving a referential clock signal used for a data transmission/reception and a write control signal indicating a write period from the external data bus and outputting a latch signal at an edge timing of the referential clock signal in the write period, wherein the transmission/reception buffer latches data from the external data bus according to the latch signal output from the latch signal producing circuit.

8. A microcomputer according to claim 5, the microcomputer further comprises:

an enciphering circuit, having a second transmission/reception buffer, for enciphering or deciphering data stored in the second transmission/reception buffer;

a selector, connected with the external data bus, for selecting either the transmission/reception buffer or the second transmission/reception buffer as an internal connected buffer to directly connect the external data bus and the internal connected buffer; and a selector flag, in which a value is written by the central processing unit, for outputting a selector signal corresponding to the value to the selector to make the selector determine the internal connected buffer according to the selector signal.

9. A microcomputer, including a central processing circuit, storing means, and an internal data bus connecting the central processing circuit and the storing means and a transmission/reception buffer being arranged between an external data bus and the internal data bus, comprising:

a latch signal producing circuit for receiving a referential clock signal used for a data transmission/reception and a write control signal indicating a write period from the external data bus and outputting a latch signal at an edge timing of the referential clock signal in the write period, wherein the transmission/reception buffer latches data from the external data bus according to the latch signal output from the latch signal producing circuit.

10. A microcomputer according to claim 9, wherein the internal data bus and the transmission/reception buffer are formed to correspond to a bus width which is N times (N is a positive integral number) that of the external data bus, and the central processing circuit selects either the bus width of the internal data bus or the bus width of the external data bus according to a change-over signal; input from an outside to access to the transmission/reception buffer at the selected bus width.

11. A microcomputer according to claim 9, the microcomputer further comprises:

an enciphering circuit, having a second transmission/reception buffer, for enciphering or deciphering data stored in the second transmission/reception buffer;

a selector, connected with the external data bus, for selecting either the transmission/reception buffer or the second transmission/reception buffer as an internal connected buffer to directly connect the external data bus and the internal connected buffer; and a selector flag, in which a value is written by the central processing unit, for outputting a selector signal corresponding to the value to the selector to make the selector determine the internal connected buffer according to the selector signal.

12. A microcomputer, including a central processing circuit, storing means, and an internal data bus connecting the central processing circuit, the storing means and a transmission/reception buffer being arranged between an external data bus and the internal data bus, comprising:

an enciphering circuit, having a second transmission/reception buffer, for enciphering or deciphering data stored in the second transmission/reception buffer;

a selector, connected with the external data bus, for selecting either the transmission/reception buffer or the second transmission/reception buffer as an internal connected buffer to directly connect the external data bus and the internal connected buffer; and a selector flag, in which a value is written by the central processing unit, for outputting a selector signal corresponding to the value to the selector to make the selector determine the internal connected buffer according to the selector signal.

13. A microcomputer according to claim 12, wherein the internal data bus and the transmission/reception buffer are formed to correspond to a bus width which is N times (N is a positive integral number) that of the external data bus, and the central processing circuit selects either the bus width of the internal data bus or the bus width of the external data bus according to a change-over signal input from an outside to access to the transmission/reception buffer at the selected bus width.

\* \* \* \* \*